Patented Dec. 9, 1941

2,265,937

UNITED STATES PATENT OFFICE 2,265,937

TREATMENT OF METHACRYLIC ACID ESTERS

Harry Robert Dittmar, Wilmington, Del., assignor to E. I. du Pont de Nemours & Company, Wilmington, Del., a corporation of Delaware No Drawing. Application June 25, 1938
Serial No. 215,880

1 Claim. (Cl. 260—83)

This invention relates to the treatment of polymerized compounds and more particularly to the treatment of polymeric derivatives of methacrylic acid to render them tasteless and odorless.

Many of the polymeric resins such as the polyvinyl esters, the polymeric styrenes, the polymeric esters of acrylic and methacrylic acid and others are useful as ingredients in lacquer and coating compositions. One of the uses for such compositions is in coating containers for preserving comestibles and potable liquids, in order to prevent direct contact thereof with the metal or cardboard container. When used for this purpose, many of the polymeric resins have been found to impart such an undesirable taste to foodstuffs or beverages in contact therewith that they have been wholly unacceptable. Many methods have been investigated for removing the taste and odor from polymeric resins, such as the esters of acrylic and methacrylic acids; for example, washing with water and methanol; dissolving in a solvent and precipitating by the addition of a non-solvent; heating in a vacuum oven; dissolving in a solvent and distilling off a portion of the solvent; and steam distilling the polymer.

An object of the invention is to remove taste and odor from polymeric resins by a process superior to any heretofore known. Another object of the invention is to provide a process for removing taste and odor from polymeric resins and, more particularly, from the polymeric derivatives of acrylic and methacrylic acids which are especially suitable for lining food containers. Yet another object of the invention is to provide a process for purifying polymeric compounds, which is effected by treating a liquid dispersion of such compounds with an alkali. Other objects and advantages of the invention will hereinafter appear.

Briefly stated, the above objects are accomplished by subjecting the polymerized resin to the action of an alkaline solution while the compound is preferably in a comminuted or dissolved state. Subsequent to this treatment, the polymer is washed with water, an alcohol or other suitable solvent and then may be combined with solvents, plasticizers, fillers, pigments and the like, or, otherwise treated, for the preparation of lacquers or coating compositions, for direct application to food or beverage containers or other uses in which a tasteless and odorless polymeric compound is desired.

It is advantageous to have the particles of the polymer in as fine a state of subdivision as possible, in order that the alkali can act rapidly on the monomer. A product well adapted for treatment by my process may be prepared by emulsifying the monomer and subsequently polymerizing to give a polymer in the emulsified form. The granular product, obtained in accord with the process of U. S. Patent 2,108,044, may likewise be used. Subsequent to polymerization via these or other suitable processes, sodium hydroxide or another suitable base is added to give a solution containing from, in the order of 0.1 to 35%, based on the weight of the solution, and the emulsion or granular dispersed mixture is treated at room temperature up to in the neighborhood of 125° in order to effect, as rapidly as possible, the reaction of the caustic with the monomer. Solutions of the resin in a suitable solvent may be similarly treated.

Subsequent to the treatment with alkali, the emulsion polymer may be coagulated and washed with water, methanol, ethanol or other solvent for the alkali used, to separate therefrom the purified polymer, while the granular polymer may be washed directly for removal of the dispersed medium and the alkali together with the contaminating constituents. The thus purified resin, from which all taste and odor has been removed, is dried and, in this form, is ready for any use in which such resins are demanded.

My process is applicable to the treatment of polymeric resins, generally, and particularly those which are more or less difficult to completely polymerize. As examples of these resins which may be treated by my process, are the polymeric esters of acrylic and methacrylic acid. Specific esters of exceptional utility for coating food and beverage containers include the methyl, ethyl, n-propyl, isopropyl, n-butyl, isobutyl, cyclohexyl, octyl, β-ethoxyethyl, β-butoxyethyl, β-methoxyethyl and lauryl methacrylic polymers. Other polymeric ester resins such as polyvinyl acetate may be purified also by my process. Interpolymers containing at least one of the above methacrylic acid esters or vinyl esters, i. e., compounds formed by polymerizing the monomers or mixtures of polymers may likewise be treated by my process.

The more detailed practice of the invention is illustrated by the following examples, in which parts given are by weight unless otherwise stated. There are, of course, many forms of the invention other than these specific embodiments.

*Example I*

To 100 pounds of water, in a 20 gallon stainless steel kettle, 5 pounds of sodium hydroxide and 0.25 pounds of methylated starch were added, the mixture was stirred and indirect heating was applied. When a temperature of 70° C. was reached, 20 pounds of finely divided granular n-butyl methacrylate polymer was gradually added over a 3-minute period. The temperature was then raised to 75–80° C. and maintained for 6½ hours with continued stirring. At the end of this time the charge was cooled to 35° C. (stirring being continued during the cooling operation). The polymer was then removed from the wash liquid by centrifuging and was further purified by washing with water until no longer basic to litmus, following which it was dried in a current of air. The treated polymer was substantially tasteless and odorless.

This procedure was repeated using (1) propyl methacrylate polymer, (2) isobutyl methacrylate polymer, and (3) an interpolymer composed of 80% butyl methacrylate and 20% methyl methacrylate. In each instance the treatment produced a substantially tasteless and odorless resin.

Example II

A solution was prepared by dissolving 4 parts methylated starch in 800 parts of water and 200 parts of aqua ammonia (specific gravity 0.90). To this was added 200 parts of finely divided granular n-butyl methacrylate polymer and the mixture was heated 2½ hours at 80° C. and then cooled to 30° C. Vigorous stirring was employed throughout the entire operation. The polymer was then filtered to remove it from the wash liquid and washed with water, following which the entire cycle was repeated. Following the second ammonia treatment, the polymer was washed with water until, after standing in water for 20 minutes, it was neutral to litmus. The polymer was then air dried. The taste and odor of the polymer was much improved by the above treatment.

Example III 50 parts by weight of granular n-butyl methacrylate was placed in a bomb, together with 75 parts by weight of anhydrous ammonia. The bomb was closed and, after shaking, was set aside for 16 hours at room temperature. The bomb was then opened, the ammonia allowed to evaporate and the granular polymer thoroughly washed with water. Subsequent to this treatment, the granular polymer was boiled for two 1-hour periods with water and the resulting product air dried, to give an odorless and tasteless granular polymer.

Example IV 50 parts by weight of n-butyl methacrylate polymer was treated at room temperature for 6 hours with 210 parts of methanol, 90 parts of water and 15 parts of sodium hydroxide. The resulting polymer was washed with methanol until alkali-free and then air dried. A substantially tasteless and odorless product was obtained.

Example V 30 parts of polyvinyl acetate in granular form was stirred for 8 hours at about 80° C. in 500 pts. of an 0.5% aqueous solution of sodium hydroxide. The resin, separated from the alkali solution, washed and dried, was essentially tasteless and odorless.

It should be noted that when the treatment of emulsions or dispersions of polymers is effected at temperatures approaching the softening point of the resin, say, in the neighborhood of 90–110° C., in the case of polymeric methyl methacrylate, it is advantageous to have a dispersing agent present. This is to prevent the coagulation of the emulsion or dispersion, for without the presence of a dispersing agent, treatment at these temperatures, in the presence of an alkali, will often coagulate the dispersion and thus prevent thorough treatment. Various well known types of dispersing agents may be used for this purpose such as those indicated in the examples, as well as sodium alkyl sulfates, sodium alkyl sulfonates, polymeric sodium methacrylate and polyvinyl alcohol.

From a consideration of the above specification, it will be appreciated that many changes may be made in the details and proportions therein given without departing from the invention or sacrificing any of the advantages that may be derived therefrom.

I claim:

A process of removing taste and odor from polymeric n-butyl methacrylate which comprises preparing a mixture of 100 pounds of water, 5 pounds of sodium hydroxide, and 0.25 pound of methylated starch, heating the resulting mixture to a temperature of approximately 70° C. and subsequently gradually adding thereto over a period of approximately three minutes approximately 20 pounds of finely divided granular n-butyl methacrylate polymer, raising the temperature to between 75 and 80° C. and holding the mixture at that temperature while continually stirring for approximately 6½ hours, and finally cooling to approximately 35° C., separating the thus treated polymer by centrifuging and further purifying the polymer by washing with water until no longer basic to litmus.

HARRY ROBERT DITTMAR